United States Patent
Cheron et al.

[11] Patent Number: 5,982,965
[45] Date of Patent: Nov. 9, 1999

[54] OPTICAL FIBER TELECOMMUNICATIONS CABLE

[75] Inventors: Philippe Cheron; Patrick Jamet, both of Paris, France

[73] Assignee: SAT Societe Anonyme de Telecommunications, Paris, France

[21] Appl. No.: 08/965,003

[22] Filed: Nov. 5, 1997

[30] Foreign Application Priority Data

Nov. 8, 1996 [FR] France .................................. 96 13664

[51] Int. Cl.⁶ ...................................................... G02B 6/44
[52] U.S. Cl. ........................ 385/100; 385/109; 385/110; 385/112; 385/113
[58] Field of Search .................................. 385/100, 102, 385/106, 108, 109, 112, 113

[56] References Cited

U.S. PATENT DOCUMENTS

| | | | |
|---|---|---|---|
| 4,230,395 | 10/1980 | Dean et al. ......................... | 385/100 X |
| 4,496,214 | 1/1985 | Oestreich et al. .................. | 385/100 X |
| 4,515,435 | 5/1985 | Anderson ............................ | 385/107 X |
| 4,550,976 | 11/1985 | Cooper et al. ...................... | 385/113 X |
| 4,687,294 | 8/1987 | Angeles .............................. | 385/102 X |
| 4,798,443 | 1/1989 | Knipe et al. ........................ | 385/100 X |
| 4,898,451 | 2/1990 | Story .................................. | 385/100 X |
| 5,113,468 | 5/1992 | Baker ................................. | 385/100 |
| 5,155,789 | 10/1992 | Le Noane et al. ................. | 385/106 |
| 5,509,097 | 4/1996 | Tondi-Resta et al. ............. | 385/113 |
| 5,542,020 | 7/1996 | Horska ............................... | 385/112 |
| 5,619,606 | 4/1997 | Bonicel ............................. | 385/102 |
| 5,862,284 | 1/1999 | Paborn et al. .................... | 385/106 |

FOREIGN PATENT DOCUMENTS

| | | | |
|---|---|---|---|
| 2321133 | 3/1977 | France .............................. | 385/113 X |
| 3200760 | 7/1983 | Germany ........................... | 385/113 X |

OTHER PUBLICATIONS

Patent Abstracts of Japan vol.8, No. 183 (P–296) (1620), Aug. 23, 1984 & JP 59 074511 A (Furukawa Denki Kogyo), Apr. 27, 1984 *abrégé*.

*Primary Examiner*—Brian Healy
*Attorney, Agent, or Firm*—Griffin, Butler, Whisenhunt & Szipl, LLP

[57] ABSTRACT

The telecommunications cable of the invention comprises optical fibers and stabilization fibers disposed in an envelope in such a manner as to ensure longitudinal coupling therewith, such that part of the force to which the cable is subjected is shared uniformly over the fibers.

9 Claims, 1 Drawing Sheet

OPTICAL FIBER TELECOMMUNICATIONS CABLE

The present invention relates to an optical fiber telecommunications cable.

BACKGROUND OF THE INVENTION

In general, an optical fiber cable comprises optical fibers disposed in an envelope. To ensure good signal transmission, it is generally desirable to keep the mechanical stresses to which the optical fibers are subjected while the cable is being handled down to a minimum, and in particular the stresses that occur during installation and use of the cable. That is why provision has been made over many years to associate optical fibers with a strength member of considerable size that provides decoupling between the structure of the cable, in particular the strength member, and the optical fibers, thereby ensuring that the mechanical forces exerted on the cable (in particular longitudinal forces in traction or compression) are withstood by the strength member.

Decoupling between the strength member and the optical fibers can be obtained during manufacture by providing for the optical fibers to be longer than the strength member, or by interposing layers having a low coefficient of friction and damping layers between the optical fibers and the strength member. Cables of those types are expensive to make and the resulting cable is bulky compared with the number of optical fibers it contains.

In order to mitigate those drawbacks, document FR-A-2 665 266 proposes making an optical fiber cable by providing longitudinal coupling between the optical fibers and the envelope in such a manner that mechanical forces, e.g. traction or compression forces, are shared between the envelope and the optical fibers. In the embodiment described in that document, the optical fibers are subdivided into modules, each of which is enveloped in a module sheath that is in contact with the optical fibers, and the various modules are grouped together in an envelope which is in contact with the module sheaths in order to provide longitudinal coupling therewith. The longitudinal coupling described in that document corresponds in practice to the optical fibers being in a disposition without extra length relative to the envelope, i.e. so that any lengthening or compression of the envelope gives rise to lengthening or compression of the optical fibers.

The force to be withstood by each optical fiber must remain below a threshold above which the transmission properties of the optical fiber are unacceptably degraded relative to the required performance. It will readily be understood that a cable made in that manner can withstand a larger force if it contains a larger number of optical fibers.

Also, when it is desired to manufacture cables of various dimensions, it is necessary not only to have corresponding tooling for making the envelopes, but also to stop the manufacturing line in order to change the tooling. For reasons of manufacturing costs, it is therefore preferable to minimize the number of cables having various dimensions. Also, the cost of optical fibers constitutes a very large fraction of the cost of a cable, so it is not desirable for a cable to have a large number of optical fibers solely for the purpose of distributing forces between them.

OBJECTS AND SUMMARY OF THE INVENTION

According to the invention, a telecommunications cable is proposed comprising optical fibers disposed in an envelope in such a manner as to ensure longitudinal coupling therewith, and including at least one stabilization fiber also disposed in the envelope in such a manner as to ensure longitudinal coupling therewith.

Thus, for a cable containing a small number of optical fibers and having an envelope suitable for containing a number of fibers larger than the number of optical fibers, the space left empty between the optical fibers is advantageously used to receive stabilization fibers which withstand a portion of the forces to which the cable is subjected, such that a cable of given dimensions is suitable for withstanding large forces regardless of the number of optical fibers that it contains. In this context, it may be observed that the stabilization fibers are of very low cost so that for a cable containing a small number of optical fibers, a cable is made at reduced cost but having the same performance in terms of resistance to traction or compression as a cable that would normally be much more expensive.

In an advantageous version of the invention, the stabilization fibers are of a diameter substantially equal to that of the optical fibers. Thus, both during manufacture and during use, the fibers have mechanical reactions that are substantially analogous, thereby facilitating handling.

According to an advantageous feature of the invention, the stabilization fibers can be selected to have transmission properties that are similar to those of the optical fibers. Thus, although they are of lower cost, the stabilization fibers can still be used for transmitting low definition signals or for transmitting signals over short distances.

According to another advantageous feature of the invention associated with an envelope having a coefficient of thermal expansion that is greater than that of the optical fibers, the stabilization fibers have a coefficient of thermal expansion that is less than that of the envelope. The stabilization fibers thus provide resistance against expansion and contraction of the envelope and consequently reduce the forces to which the optical fibers are subjected because of expansion or contraction of the envelope. The stabilization fibers preferably have a thermal expansion coefficient that is less than or similar to that of the optical fibers. Thus, compensation for the expansion coefficient of the envelope is further improved and it is even possible to obtain an overall coefficient of expansion for the envelope plus the stabilization fibers that is equal to the expansion coefficient of the optical fibers or that is substantially equal thereto, such that the optical fibers are subject neither to traction nor to compression during the variations of temperature to which the optical fiber cable is subjected.

According to another feature of the invention, associated with an optical fiber cable having a plurality of modules each comprising at least one optical fiber enveloped in a module sheath, the cable of the invention has a plurality of stabilization fibers distributed among the modules. The cable preferably has the same number of fibers in each module. Thus, forces can be shared in balanced manner over the various modules by providing for each module to have a number of stabilization fibers that is inversely proportional to the number of optical fibers in the module.

According to another feature of the invention that is likewise associated with a cable having a plurality of modules, the stabilization fibers are grouped together in a common module. This simplifies module manufacture.

BRIEF DESCRIPTION OF THE DRAWING

Other characteristics and advantages of the invention appear from reading the following description of three particular and non-limiting embodiments of the invention, described with reference to the accompanying figures, in which.

MORE DETAILED DESCRIPTION

Figure 1:
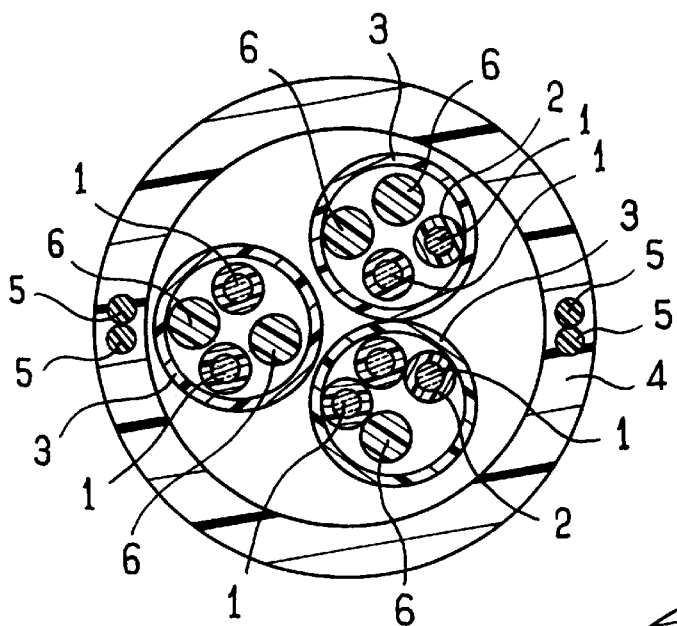
FIG. 1 is a section view through a first embodiment of a telecommunications cable of the invention.

With reference to FIG. 1, the telecommunications cable of the invention comprises, in the embodiment shown, a series of optical fibers 1 each of which is covered in a colored identification layer 2. The optical fibers are grouped together into modules, and in the example shown, each module contains two or three optical fibers. Each module is enveloped in an easily-tearable module sheath 3 of small thickness, e.g. made of polyethylene, of polypropylene, or of polyamide, and preferably extruded onto a fiber module simultaneously with the fibers being payed-out and assembled together.

The module sheaths 3 are preferably colored in order to distinguish the modules from one another, and sheath thickness lies in the range a few thousandths of a millimeter to a few tenths of a millimeter, and preferably lies in the range one-hundredth of a millimeter to one-tenth of a millimeter. The small thickness of the module sheath 3 avoids subjecting the fibers 1 to elongation and compression stresses during temperature cycles and it keeps manufacturing costs down.

The set of modules 3 is grouped together in an envelope 4 that is preferably constituted by an extruded layer of a material having a low coefficient of expansion, having low relaxation effects, having high strength imparted by a high-elasticity module, and reinforced by reinforcing members 5 that are preferably disposed as two diametrically-opposite pairs of fibers tangent to each other. The reinforcing members 5 preferably have a coefficient of thermal expansion that is smaller than that of the material constituting the envelope 4. By way of example, the reinforcing members 5 are glass fibers, carbon fibers, or optionally-rigidified aramid fibers, with aramid fibers having a coefficient of thermal expansion that is slightly negative, thus helping to compensate the coefficient of expansion of the material constituting the envelope 4.

The modules also contain stabilization fibers 6. In the embodiment of FIG. 1, the number of stabilization fibers is sufficient to make up the total number of fibers in each module to four, i.e. the number of optical fibers plus the number of stabilization fibers is equal to four. The diameter of the stabilization fibers is substantially equal to that of the optical fibers and they have mechanical properties that are similar to those of the optical fibers. When the envelope 4 has a coefficient of thermal expansion that is greater than that of the optical fibers 1, it is preferable for the stabilization fibers 6 to have a coefficient of thermal expansion that is less than that of the envelope 4 or even less than that of the optical fibers so as to oppose variations in envelope length where possible so that the resulting overall coefficient of thermal expansion of the envelope plus the stabilization fibers is substantially equal to that of the optical fibers. To this end, the stabilization fibers are preferably glass fibers, carbon fibers, or aramid fibers.

The optical fibers 1 and the stabilization fibers 6 are disposed in such a manner as to ensure longitudinal coupling with the envelope 4. In the embodiment of FIG. 1, longitudinal coupling between the fibers and the envelope 4 is obtained by placing the fibers without any excess length inside the envelope 4 such that any change in the length of the envelope 4, whether in traction or in compression, gives rise to stresses being shared in the same direction over all of the fibers.

Figure 2:
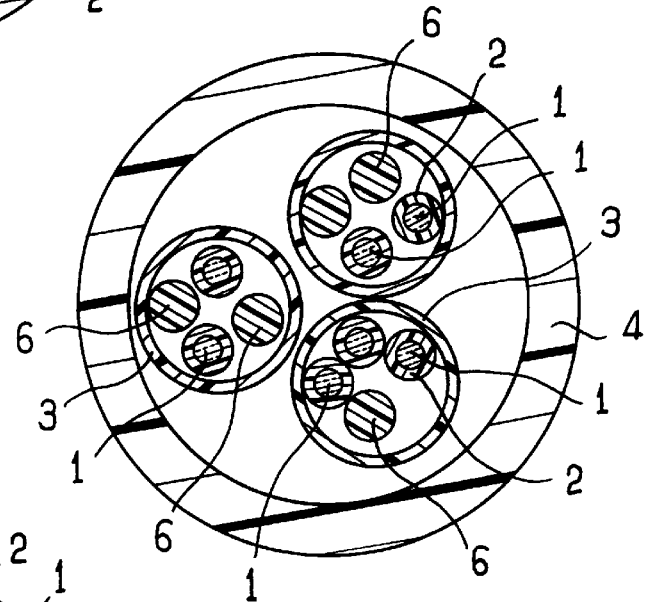
FIG. 2 is a section view through a second embodiment of the telecommunications cable of the invention.

FIG. 2 shows a second embodiment which differs from the first embodiment solely by the fact that the envelope 4 does not have a reinforcing member. This embodiment is particularly suitable for a cable containing a large number of optical fibers 1 and/or stabilization fibers 2 or one that is subjected to small forces only.

Figure 3:
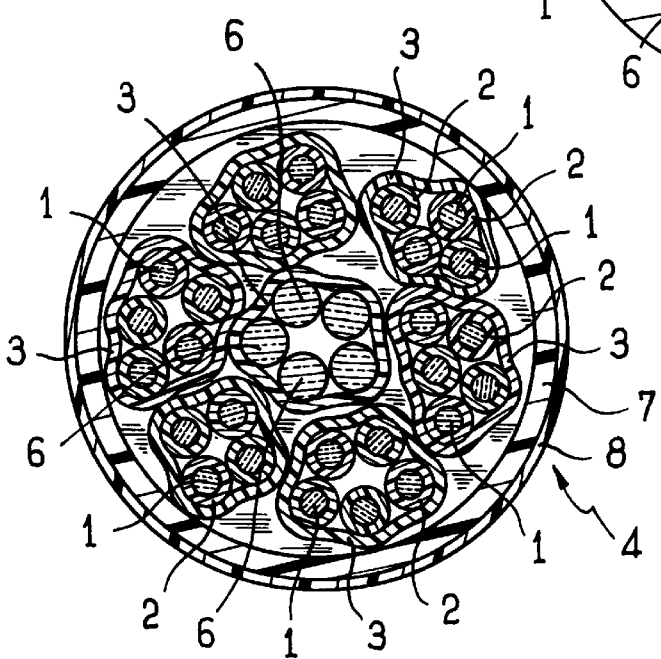
FIG. 3 is a section view through a third embodiment of the telecommunications cable of the invention.

FIG. 3 shows a third embodiment of a cable of the invention in which elements that are identical are designated by identical reference numerals. In this embodiment, the envelope 4 includes an extruded layer 7 of material having a low coefficient of expansion, low relaxation effects, and great strength, and it is covered by a second layer 8 whose function is to provide the final appearance of the cable, its resistance to abrasion, and to reduce its coefficient of friction so as to minimize forces during laying in a tubular duct.

In this embodiment, the stabilization fibers 6 are grouped together within a single module enveloped in a module sheath 3, and longitudinal coupling is provided in this case firstly by putting the fibers into contact with one another within each module, and secondly by putting the envelope 4 into contact with the modules so as to compress them lightly without stressing them.

It will be observed that because the stabilization fibers are of a diameter that is substantially equal to that of the optical fibers and because they have physical properties that are close to those of the optical fibers, the stabilization fibers and the optical fibers are completely interchangeable such that the same tooling and the same manufacturing line can be used for making cables having various numbers of optical fibers while having the same mechanical performance and thus the same transmission performance for each optical fiber.

Naturally, the invention is not limited to the embodiments described, and various embodiments can be implemented without going beyond the ambit of the invention as defined by the claims.

In particular, although the invention is described for cables in which the optical fibers are subdivided into modules, the invention can be implemented by placing the optical fibers 1 and the stabilization fibers 4 directly in an envelope 4, or indeed by placing the stabilization fibers outside modules that contain the optical fibers.

It is also possible to reinforce the envelope 4 with one or more layers of glass fiber roving or of aramid fiber roving in order to increase the strength of the cable while keeping a low coefficient of friction by an appropriate choice for the outer layer.

We claim:

1. A telecommunications cable comprising substantially non buffered optical fibers disposed in an envelope in such a manner as to ensure longitudinal coupling therewith, the cable including at least one stabilization fiber disposed in said envelope in such a manner as to also ensure longitudinal coupling therewith and having a diameter substantially equal to that of the optical fibers so as to be interchangeable with said optical fibers.

2. A telecommunications cable according to claim 1, wherein the stabilization fiber has mechanical properties similar to those of the optical fibers.

3. A telecommunications cable according to claim 1, wherein the stabilization fiber has transmission properties similar to those of the optical fibers.

4. A telecommunications cable according to claim 1, in which the envelope has a coefficient of thermal expansion greater than that of the optical fibers, the cable being wherein the stabilization fiber has a coefficient of thermal expansion lower than that of the envelope.

5. A telecommunications cable according to claim 4, wherein the stabilization fiber has a coefficient of thermal expansion lower than or equivalent to that of the optical fibers.

6. A telecommunications cable according to claim 1, including a plurality of modules, each comprising at least one optical fiber enveloped in a module sheath, the cable including a plurality of stabilization fibers distributed amongst the modules.

7. A telecommunications cable according to claim 6, wherein each module contains an identical number of fibers.

8. A telecommunications cable according to claim 1, including a plurality of modules each comprising at least one optical fiber enveloped in a module sheath, the cable including a plurality of stabilization fibers grouped together within a common module.

9. A telecommunication cable according to claim 4 wherein a resulting overall coefficient of thermal expansion of the envelope plus said at least one stabilization fiber, is substantially equal to that of the optical fibers.

* * * * *